US011723455B2

United States Patent
Hoglan et al.

(10) Patent No.: US 11,723,455 B2
(45) Date of Patent: Aug. 15, 2023

(54) DESK LIFT MECHANISM AND VARIABLE HEIGHT DESK INCLUDING THE SAME

(71) Applicant: BLUMENTHAL DISTRIBUTING, INC., Ontario, CA (US)

(72) Inventors: Korry Brian Hoglan, Eastvale, CA (US); Fred Rueda, Upland, CA (US)

(73) Assignee: BLUMENTHAL DISTRIBUTING, INC., Ontario, CA (US)

( * ) Notice: Subject to any disclaimer, the term of this patent is extended or adjusted under 35 U.S.C. 154(b) by 49 days.

(21) Appl. No.: 17/558,475

(22) Filed: Dec. 21, 2021

(65) Prior Publication Data

US 2022/0192363 A1  Jun. 23, 2022

Related U.S. Application Data

(60) Provisional application No. 63/130,236, filed on Dec. 23, 2020.

(51) Int. Cl.
*A47B 21/02* (2006.01)
*F16M 11/38* (2006.01)

(52) U.S. Cl.
CPC .............. *A47B 21/02* (2013.01); *F16M 11/38* (2013.01); *F16M 2200/044* (2013.01); *F16M 2200/063* (2013.01); *F16M 2200/068* (2013.01)

(58) Field of Classification Search
CPC ..... A47B 21/02; A47B 21/0073; A47B 21/03; A47B 2021/035; A47B 2021/0357; F16M 11/38; F16M 2200/063; F16M 2200/068
USPC ............... 108/138, 145, 72, 84, 77; 248/923
See application file for complete search history.

(56) References Cited

U.S. PATENT DOCUMENTS

| | | | | |
|---|---|---|---|---|
| 2,541,075 A | | 2/1951 | Koch | |
| 2,630,359 A | * | 3/1953 | Schade | A47B 17/02 108/138 |
| 4,194,452 A | * | 3/1980 | Crowther | A47B 21/02 108/138 |
| 5,549,052 A | * | 8/1996 | Hoffman | A47B 9/00 108/138 |
| 5,597,199 A | * | 1/1997 | Hoffman | A47B 85/00 297/188.1 |
| 6,003,450 A | * | 12/1999 | Bruckner | A47B 9/18 108/71 |

(Continued)

FOREIGN PATENT DOCUMENTS

KR  10-2017-0045831 A  4/2017

OTHER PUBLICATIONS

Canadian Office action issued in corresponding application No. CA 3,143,748, dated Feb. 15, 2023, 5 pages.

(Continued)

*Primary Examiner* — Jose V Chen
(74) *Attorney, Agent, or Firm* — Lewis Roca Rothgerber Christie LLP

(57) ABSTRACT

A desk lift mechanism includes: a base mounting bracket configured for mounting to a desk; a plurality of parallel arms pivotably coupled to the base mounting bracket; a desktop mounting bracket pivotably coupled to distal ends of the parallel arms; a spring connected between a proximal end of one of the parallel arms and the base mounting bracket; and a strut connected between the proximal end of the one of the parallel arms and the base mounting bracket. The strut being configured to restrain movement of the parallel arms in a downward direction.

18 Claims, 10 Drawing Sheets

(56) References Cited

U.S. PATENT DOCUMENTS

| | | | | |
|---|---|---|---|---|
| 6,038,986 | A * | 3/2000 | Ransil | A47B 9/02 |
| | | | | 108/146 |
| 7,201,108 | B2 * | 4/2007 | Eusebi | A47B 9/18 |
| | | | | 108/71 |
| 8,065,966 | B1 * | 11/2011 | Bacon | A47B 9/16 |
| | | | | 108/147 |
| 8,800,454 | B2 * | 8/2014 | Jones | A47B 9/02 |
| | | | | 108/145 |
| 9,049,923 | B1 * | 6/2015 | Delagey | A47B 9/18 |
| 9,961,991 | B1 * | 5/2018 | Chen | A47B 21/0314 |
| 10,111,518 | B2 * | 10/2018 | Blackburn | A47B 21/02 |
| 2003/0154890 | A1 * | 8/2003 | Warner | A47B 9/00 |
| | | | | 108/145 |
| 2004/0040480 | A1 * | 3/2004 | Hwang | A47B 3/02 |
| | | | | 108/145 |
| 2007/0163475 | A1 * | 7/2007 | Murphy | A47B 9/00 |
| | | | | 108/147 |
| 2013/0139736 | A1 * | 6/2013 | Flaherty | A47B 21/02 |
| | | | | 108/162 |
| 2015/0289641 | A1 * | 10/2015 | Ergun | A47B 9/02 |
| | | | | 108/147.22 |
| 2017/0049224 | A1 * | 2/2017 | Kim | A47B 21/02 |
| 2017/0127821 | A1 * | 5/2017 | Carter | A47B 9/10 |

OTHER PUBLICATIONS

"Pop-Up Table Mechanism" made public by "Lee Valley Tools" dated Aug. 11, 2020, Archive URL: https://www.leevalley.com/en-ca/shop/hardware/mechanisms/table/74446-pop-up-table-mechanism, 3 page.

* cited by examiner

DESK LIFT MECHANISM AND VARIABLE HEIGHT DESK INCLUDING THE SAME

CROSS-REFERENCE TO RELATED APPLICATION

The present application claims priority to and the benefit of U.S. Provisional Patent Application Ser. No. 63/130,236, filed on Dec. 23, 2020, the entire content of which is incorporated herein by reference.

BACKGROUND

1. Field

Aspects of embodiments of the present disclosure are directed to a desk lift mechanism and a variable height desk including the desk lift mechanism.

2. Description of the Related Art

As the health risks related to being seated for long periods of time become more well known, there has been a trend toward implementing standing desks for workers. However, standing for long periods of time may become uncomfortable and may have separate health risks. Thus, variable height desks, also known as sit/stand desks, have been developed.

Variable height desks generally include a desktop that is configured to move upwardly and downwardly to permit a user to either sit or stand at the desk based on the user's desire. Variable height desks may be manually operated (also referred to as mechanically operated) or electrically operated. Manual variable height desks are moved by the user (e.g., are manually moved by the user) to the desired position, while electrical variable height desks are moved by various suitable electrical components, such as motors, to the desired height.

Manually operated variable height desks are cheaper to manufacture and, thus, are popular. Due to the weight of the desktop to be moved by the user with such variable height desks, different spring and/or gas piston designs have been implemented to aid the user in lifting the desktop. These designs, however, rely on the user to "push" the desktop downwardly to lower the desktop and, if the user releases the desk before it is fully lowered, the desktop may unpredictably fall to the lowest position. This unexpected and/or uncontrolled lowering of the desktop may result in damage to the desk itself or to the user.

SUMMARY

Aspects of embodiments of the present disclosure are directed toward a desk lift mechanism and a variable height desk including the desk lift mechanism. The desk lift mechanism has a plurality of locked positions from which the user can select according to the user's desire (e.g., the user can select an appropriate height). The desk lift mechanism includes a gas strut and a spring. The spring is configured to assist the user in lifting a desktop of a variable height desk including the desk lift mechanism, and the gas strut is configured to assist the user in lifting the desktop and also to restrain (e.g., resist) the lowering of the desktop.

According to an embodiment of the present disclosure, a desk lift mechanism includes: a base mounting bracket configured for mounting to a desk; a plurality of parallel arms pivotably coupled to the base mounting bracket; a desktop mounting bracket pivotably coupled to distal ends of the parallel arms; a spring connected between a proximal end of one of the parallel arms and the base mounting bracket; and a strut connected between the proximal end of the one of the parallel arms and the base mounting bracket. The strut is configured to restrain movement of the parallel arms in a downward direction.

The desk lift mechanism may further include a stop mechanism, and the stop mechanism may include: a plurality of stop grooves; and a protrusion on the one of the parallel arms. The protrusion is configured to fit into the stop grooves.

A pivotable coupling between the one of the parallel arms and the base mounting bracket may be between the distal and proximal ends of the one of the parallel arms.

The one of the parallel arms may be a second one of the parallel arms. A first one of the parallel arms may be mounted at an end of the base mounting bracket, and the second one of the parallel arms may be mounted at an area of the base mounting bracket spaced apart from the end thereof.

The parallel arms may pivot about parallel axes.

The parallel axes may be offset in a length direction of the base mounting bracket.

When the parallel arms are in an extended position, the desktop mounting bracket may protrude farther beyond a front end of the base mounting bracket than when the parallel arms are in a lowered position.

According to an embodiment of the present disclosure, a variable height desk includes: a base; a leg coupled to and supporting the base; a desktop over the base; and a plurality of desk lift mechanisms connected between the base and the desktop. Each of the desk lift mechanisms includes: a base mounting bracket mounted to the base; a plurality of parallel arms pivotable mounted to the base mounting bracket; a desktop mounting bracket pivotably coupled to the parallel arms and fixedly mounted to the desktop; and a strut connected between the base mounting bracket and one of the parallel arms to restrain movement of the desktop in a direction toward the base.

The variable height desk may further include a horizontal support member connecting the desk lift mechanisms to each other.

The one of the parallel arms may be a second one of the parallel arms, and a first one of the parallel arms may be mounted to the base mounting bracket nearer to a front of the base than the second one of the parallel arms.

The horizontal support member may be connected to the second one of the parallel arms of the desk lift mechanisms.

Each of the desk lift mechanisms may further include a spring, and the strut and the spring may both be connected between the second one of the parallel arms and a rear end of the base mounting bracket.

The second one of the parallel arms may be pivotably coupled to the base mounting bracket at an area between where the desktop mounting bracket is coupled to the second one of the parallel arms and where the strut and the spring are connected to the second one of the parallel arms.

Each of the desk lift mechanisms may further include a stop mechanism, and the stop mechanism may include: a plurality of stop grooves; and a protrusion configured to fit into the stop grooves. The protrusion may be on the second one of the parallel arms, and the stop grooves may be in a stop bar. The stop bar may be pivotably coupled to the base mounting bracket.

The first one and the second one of the parallel arms may pivot about parallel axes, and the parallel axes may be offset from each other in a direction from a front of the base to a rear of the base.

The base may include a bottom and a plurality of sides extending from a periphery of the bottom, and an area between the bottom and the sides of the base may form a recess.

The desk lift mechanisms may be accommodated in the recess in the base.

The base may have openings in the bottom thereof at areas corresponding to the desk lift mechanisms.

The base may further include a plurality of mounting rails protruding from the bottom and in the recess, and the base mounting brackets of the desk lift mechanisms may be respectively coupled to the mounting rails.

In a lowered state of the desktop, the desktop may contact an upper end of the sides of the base, and the desktop may protrude past a front end of the base.

BRIEF DESCRIPTION OF THE DRAWINGS

These and other aspects and features of the present disclosure will be further appreciated and better understood with reference to the specification, claims, and appended drawings, in which:

DETAILED DESCRIPTION

Figure 1:
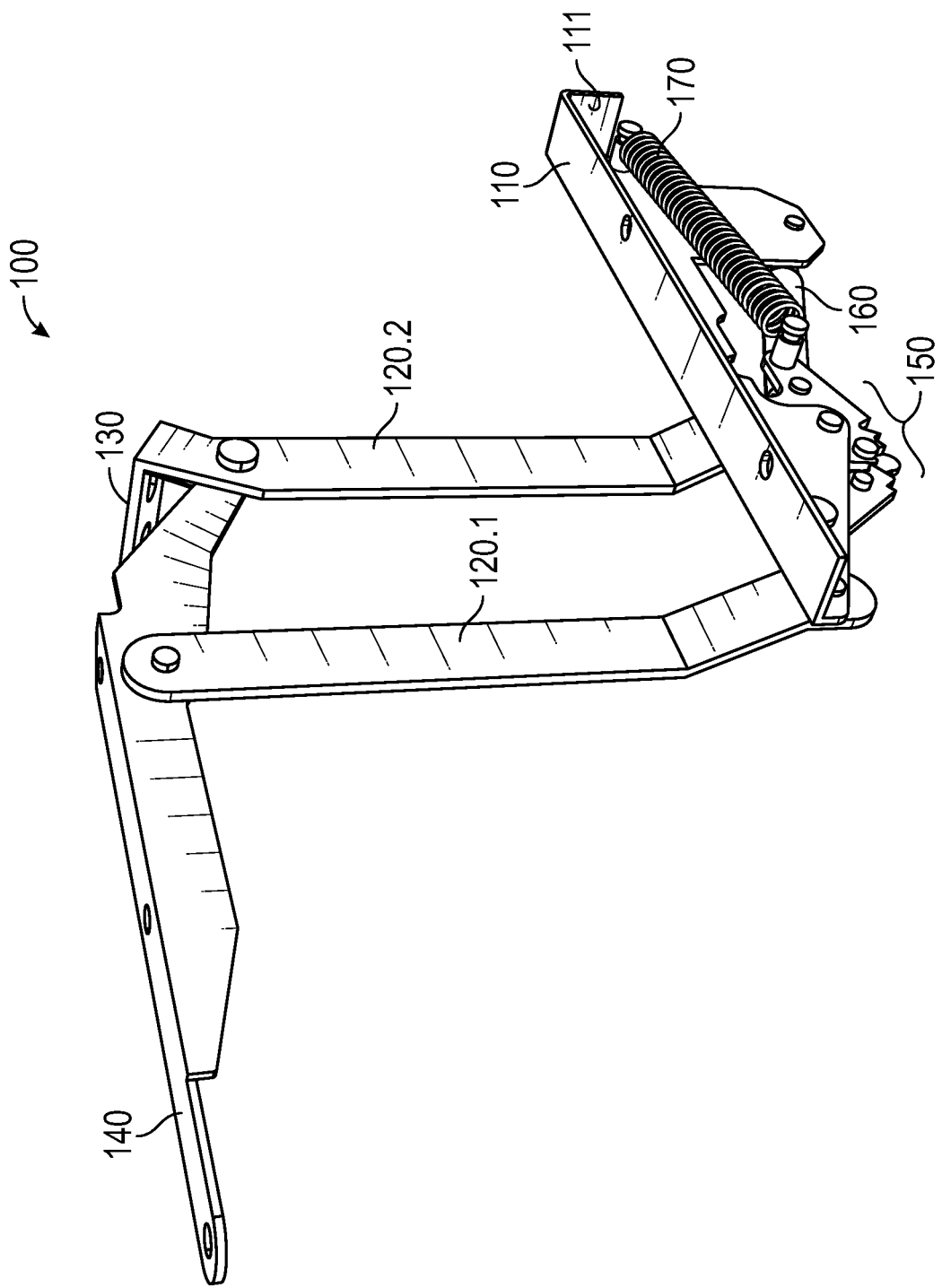
FIG. 1 is a perspective view of a desk lift mechanism according to an embodiment of the present disclosure.

The detailed description set forth below, in connection with the appended drawings, is intended as a description of example embodiments of the present disclosure and is not intended to represent the only forms in which the present disclosure may be embodied. The description sets forth aspects and features of the present disclosure in connection with the illustrated example embodiments. It is to be understood, however, that the same or equivalent aspects and features may be accomplished by different embodiments, and such other embodiments are encompassed within the spirit and scope of the present disclosure. As noted elsewhere herein, like reference numerals in the description and the drawings are intended to indicate like elements. Further, descriptions of features, configurations, and/or other aspects within each embodiment should typically be considered as available for other similar features, configurations, and/or aspects in other embodiments.

Figure 5:
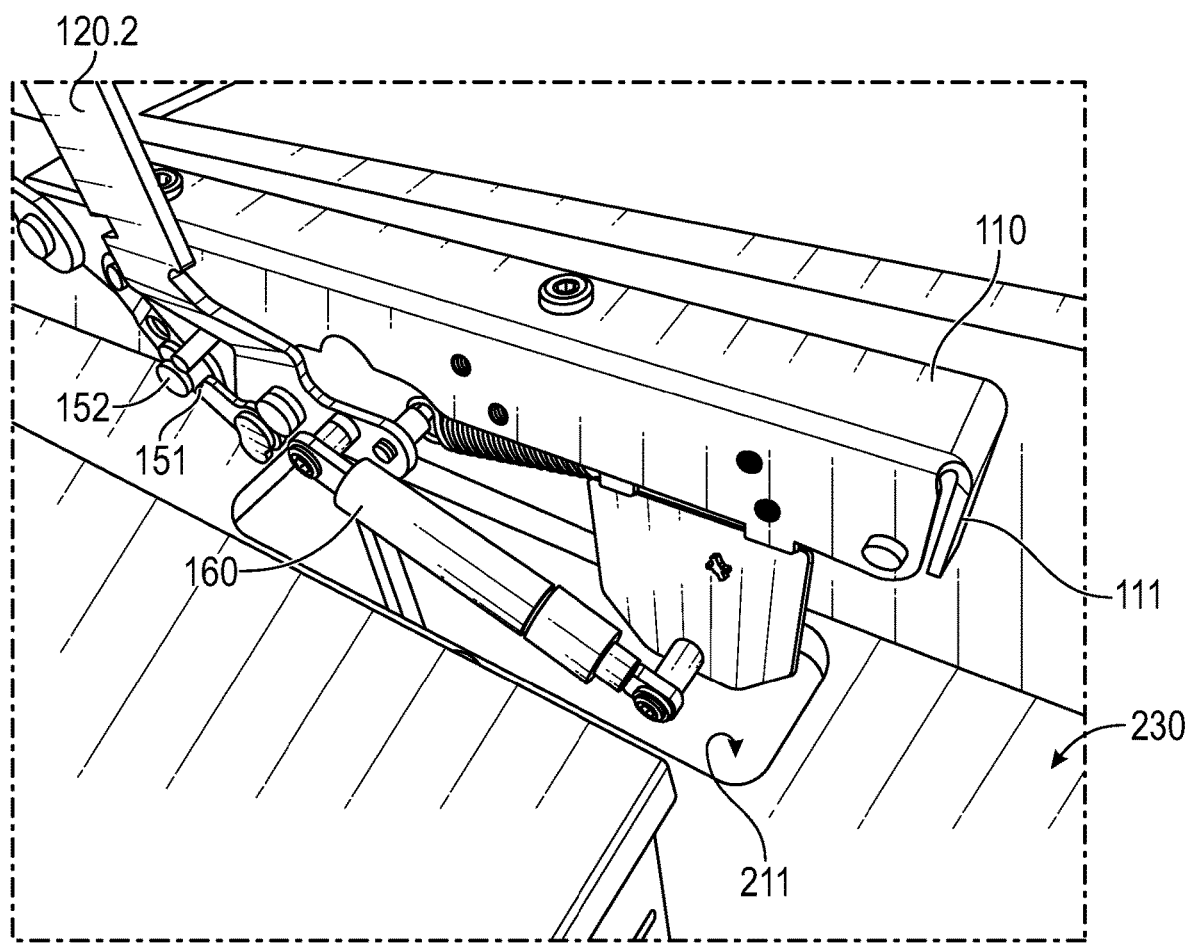
FIGS. 5 and 6 show different portions of the desk lift mechanism shown in FIG. 1 installed in the variable height desk shown in FIG. 2.
Figure 6:
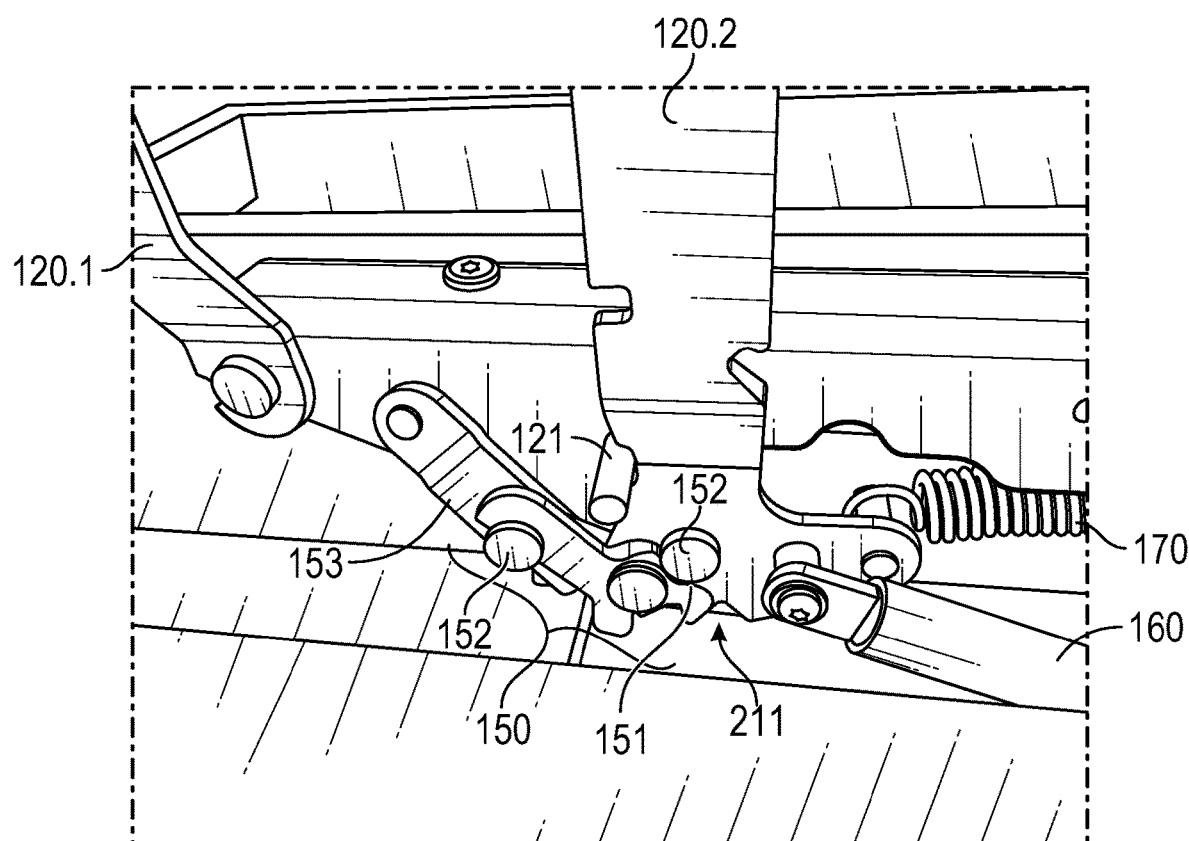

FIG. 1 shows a desk lift mechanism 100 according to an embodiment of the present disclosure, and FIGS. 5 and 6 show different portions of the desk lift mechanism 100 installed in a variable height desk. The variable height desk will be described in more detail with respect to FIG. 2.

Referring to FIGS. 1, 5, and 6, the desk lift mechanism 100 includes a base mounting bracket 110, a plurality of parallel arms 120 pivotably coupled to the base mounting bracket 110, a support bracket 130, and a desktop mounting bracket 140 pivotably mounted to the parallel arms 120.

As explained in more detail below, the desk lift mechanism 100 is connected to (or installed in) a variable height desk (see, e.g., FIG. 2) by the base mounting bracket 110. As shown in, for example, FIG. 5, the base mounting bracket 110 may have an L-shape cross section to fit over a rail or other corresponding mounting structure in the variable height desk, and openings may be formed in base mounting bracket 10 through which mechanical fasteners, such as screws, may be fitted. However, mechanical fasteners are an example, and when both the variable height desk is made of metal or some other weldable material, the desk lift mechanism 100 may be welded to the variable height desk such that openings therein for mechanical fasteners may be omitted. The base mounting bracket 110 may also have a stop plate 111 to locate the desk lift mechanism 100 relative to the desk. For example, the stop plate 111 may extend downwardly from an end of the base mounting bracket 110 to contact a face of the rail or other corresponding mounting structure in the desk. Due to the L-shaped cross section of the base mounting bracket 110 and the stop plate 111, the desk lift mechanism 100 may be located in three directions in the variable height desk to ensure ease of installation.

The parallel arms 120 include, in some embodiments, two parallel arms 120.1 and 120.2. The two parallel arms 120.1 and 120.2 may be referred to as a front parallel arm 120.1 and a rear parallel arm 120.2. As used herein, the term "front" refers to a direction facing or toward a user sitting or standing at the variable height desk. Further, all (e.g., both) of the parallel arms 120 may be referred to collectively as "the parallel arms 120," and the parallel arms may be referred to individually as "the front parallel arm 120.1" and "the rear parallel arm 120.2."

While the illustrated embodiment includes two parallel arms 120, the present disclosure is not limited thereto. The number of the parallel arms 120 may be reduced or increased depending on, for example, a size of the desktop to be lifted and lowered by the desk lift mechanism 100.

The parallel arms 120 are arranged along the base mounting bracket 110 in a length direction of the base mounting bracket 110. The parallel arms 120 may pivot along the same plane and/or along parallel axes that are offset from each other along the length direction of the base mounting bracket 110.

The support bracket 130 may be connected to (or, in some embodiments, integrally formed with) the rear parallel arm 120.2. In some embodiments, the rear parallel arm 120.2 may have a bent portion that is bent approximately 90° with respect to the plane in which the parallel arms 120 pivot in a direction away from the base mounting bracket 110 to form the support bracket 130. The support bracket 130 (e.g., the bent portion of the rear parallel arm 120.2 forming the support bracket 130) may have openings therein for use with mechanical fasteners, and a horizontal support member 300 may be mounted to the support bracket 130 by using mechanical fasteners extending through corresponding openings in the horizontal support member 300 and in the support bracket 130. The horizontal support member 300 may connect two of the desk lift mechanisms 100 to each other in a single variable height desk and/or may further connect the desk lift mechanism 100 to the desktop of the variable height desk to improve stability and prevent twisting of a desktop relative to a base of the variable height desk, to be described in more detail below.

The desktop mounting bracket 140 is pivotably mounted to the parallel arms 120. The desktop mounting bracket 140 may be coupled to a distal end of the parallel arms 120, and the parallel arms 120 be coupled to the base mounting bracket 110 at a proximal end of the parallel arms 120. The front parallel arm 120.1 may be coupled to a center area of the desktop mounting bracket 140, and the rear parallel arm 120.2 may be coupled to a rear end of the desktop mounting bracket 140, but this is just an example. By being pivotably mounted to the parallel arms 120 (e.g., by being pivotably mounted to both the front and rear parallel arms 120.1 and 120.2), the desktop mounting bracket 140 may remain parallel to base mounting bracket 110 in each of the different positions (e.g., different configurations, orientations, or heights) of the desk lift mechanism 100, to be described below. In this way, a desktop of the variable height desk mounted to the desktop mounting bracket 140 remains parallel to the floor in each of the different height positions of the desktop.

The desktop mounting bracket 140 may have openings therein for connection to a desktop by mechanical fasteners, for example. This is an example, however, and if suitable materials are used, the desktop mounting bracket 140 may be adhered, welded, etc. to the desktop of the variable height desk. When mechanical fasteners are to be used, the desktop mounting bracket 140 may have openings at a front end, a center area, and a rear end for secure connection to a desktop. The present disclosure is not limited thereto, however.

The desk lift mechanism 100 further includes a stop mechanism 150, a strut (e.g., a damping piston) 160, and a spring (e.g., a lift assist spring) 170. The stop mechanism 150 (see, e.g., FIGS. 1 and 6) secures the parallel arms 120 at different heights (or configurations, orientations, etc.) relative to the base mounting bracket 110. In the illustrated embodiment, the stop mechanism 150 may provide four different heights, including a lowered height, two intermediate heights, and a raised height, to be described in more detail below. The stop mechanism 150 may include a plurality of stop grooves 151 and one or more protrusions 152 that fit into the stop grooves 151. The protrusions 152 may be on the proximal end of the rear parallel arm 120.2, and the stop grooves 151 may be formed on a stop bar 153 (see, e.g., FIG. 6) that is pivotably mounted to the base mounting bracket 110.

The interaction between the protrusion(s) 152 and the stop grooves 151 may restrain movement of the parallel arms 120 (and the desktop when connected to the parallel arms 120) in the downward direction (e.g., toward the floor). For example, the stop mechanism 150 may operate as a ratchet mechanism that freely allows the parallel arms 120 to be raised while restricting movement of the parallel arms 120 in the downward direction. As the parallel arms 120 are raised, the protrusion(s) 152 may fall into one or more corresponding stop grooves 151 and may make an audible noise, alerting a user that the desktop has been raised to another height and can be released without risk of the desktop dropping back down. The stop mechanism 150 does not, however, totally restrict movement of the parallel arms 120 (and the desktop) in the downward direction. For example, if sufficient force is applied to the parallel arms 120 (or to the desktop connected to the parallel arms 120), the restraining force of the stop mechanism 150 can be overcome, allowing the desktop to be lowered.

The strut 160 and the spring 170 assist with the raising and/or lowering of the parallel arms 120 (and the desktop connected to the parallel arms 120). Both the strut 160, which may a strut damper having a fluid-filled body, and the spring 170 are connected between (e.g., extend between) the base mounting bracket 110 (e.g., a rear end of the base mounting bracket 110) and the proximal end of the rear parallel arm 120.2. In the illustrated embodiment, the strut 160 and the spring 170 may be connected to the rear parallel arm 120.2 at an area near to the stop mechanism 150, but the present disclosure is not limited thereto. To assist with the raising and/or lowering of the parallel arms 120, the strut 160 and the spring 170 are connected to one end of the rear parallel arm 120.2 at a first side of where the rear parallel arm 120.2 is pivotably coupled to the base mounting bracket 110 while the desktop mounting bracket 140 is connected to an opposite end of the rear parallel arm 120.2 at a second side of where the rear parallel arm 120.2 is pivotably coupled to the base mounting bracket 110. In this way, the strut 160 and the spring 170 act to offset (or counter) the weight of the desktop about the pivoting axis of the rear parallel arm 120.2.

When a user raises the desktop, the spring 170 may pull on the proximal end of the rear parallel arm 120.2, which acts to offset the weight of the desktop lifted by the user, and prevents the user from having to lift the entire weight of the desktop to raise the desktop.

When a user lowers the desktop, the strut 160 may act to restrain the lowering of the desktop. For example, as the rear parallel arm 120.2 returns toward the lowered position, the distance between the proximal end of the rear parallel arm 120.2 and the rear of the base mounting bracket 110 may decrease. Thus, the strut 160 may decrease in overall length, and as is understood by those skilled in the art, the fluid in the strut 160 acts to slow (or restrict) the motion of the rear parallel arm 120.2, causing the desktop to be lowered in a controlled manner. The raising and lowering the desktop will be described in more detail below.

Figure 2:
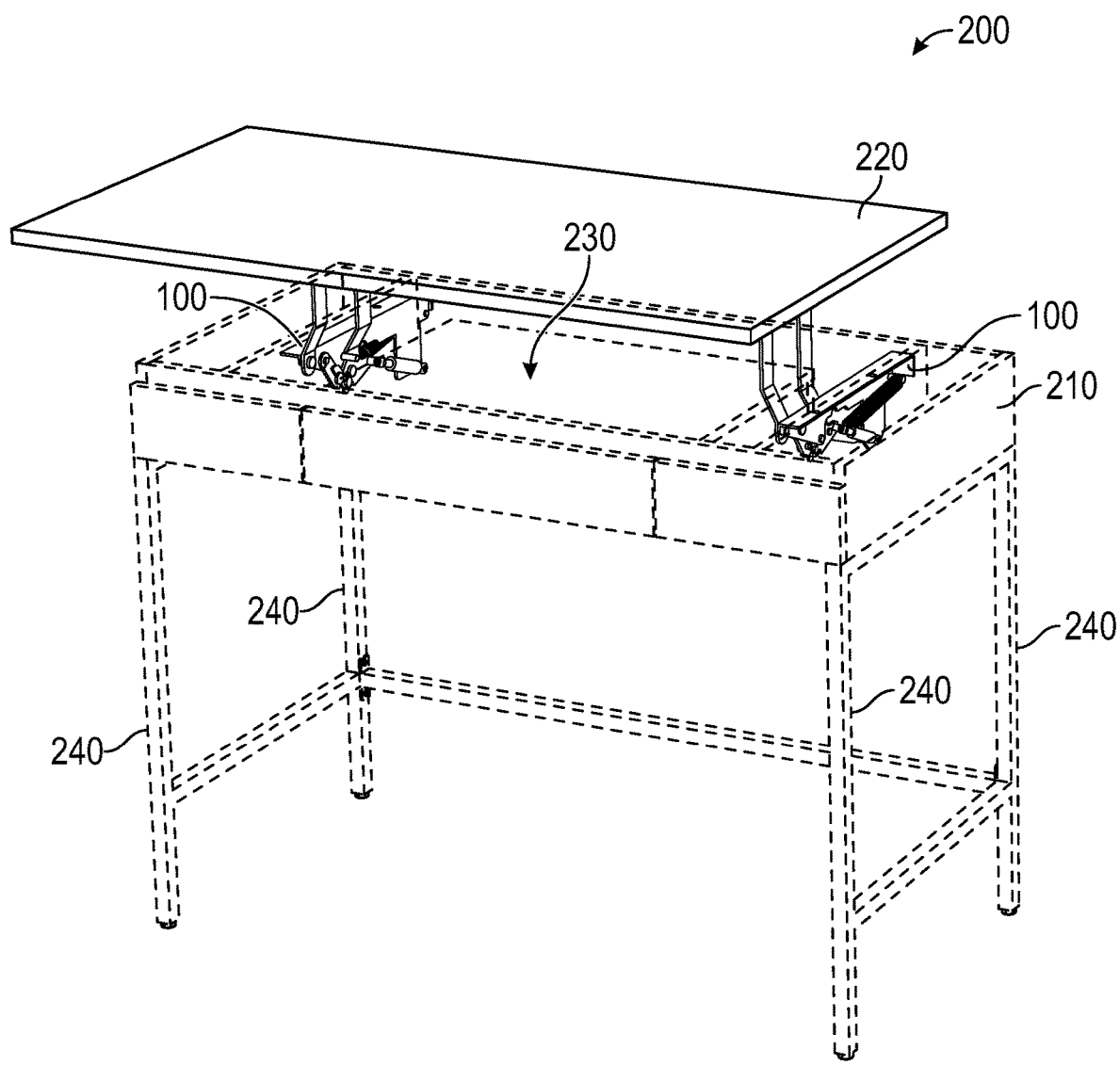
FIG. 2 is a perspective view of a variable height desk including the desk lift mechanism shown in FIG. 1 according to an embodiment of the present disclosure.

FIG. 2 shows a variable height desk 200 according to an embodiment of the present disclosure. The variable height desk 200 includes a plurality of the desk lift mechanisms 100, described above, and repeated descriptions thereof may be omitted.

The variable height desk 200 may include a base 210, a plurality of legs 240, and a desktop 220, but the present disclosure is not limited thereto. In the illustrated embodiment, the variable height desk 200 includes four legs 240, but in other embodiments, the variable height desk 200 may have more or fewer than four legs 240. For example, another embodiment of the variable height desk 200 may include a single multisided support that additionally provides under-desk privacy, may include three legs, each of which are extended in a length or width direction of the desk, etc. Similarly, the variable height desk 200 is not limited to any particular shape. Thus, while the illustrated embodiment has a rectangular shape, the present disclosure is not limited thereto. In other embodiments, the variable height desk 200 may have any suitable shape, such as square, curved, angled, such as to fit into a corner, etc.

The legs 240 are connected to the base 210 and support the base 210. The legs 240 may have a length such that the desktop 220 (e.g., an upper surface, also referred to as a work surface, of the desktop 220), in a lowered position, is at a comfortable seated height for a user (e.g., in a range of about 28 inches to about 30 inches).

The base 210 may have a recess (e.g., a pocket) 230 therein. For example, the base 210 may include a bottom and sides along a periphery of the bottom to form the recess 230. The recess 230 may accommodate (e.g., may house) a plurality of the desk lift mechanisms 100 (described above). Because the desk lift mechanisms 100 include moving parts, the recess 230, and the bottom and sides of the base 210 forming the recess 230, protect a user from being pinched in the desk lift mechanisms 100 and protect the desk lift mechanisms 100 from damage and debris. A front side (e.g., a side toward a user at the variable height desk 200) of the base 210 may include a groove, and the desktop 220 may extend over the groove. The groove may provide an area of an underside of the desktop 220 at where a user can grasp it to raise it from its lowered position. The present disclosure, however, is not limited to this arrangement. In other embodiments, the desktop 220 may be oversize with respect to the base 210 in at least one dimension (or offset from the base 210 in at least one direction) to provide an area for a user to grasp the underside of the desktop 220.

As shown in FIG. 2, the variable height desk 200 may include two of the desk lift mechanisms 100, one at either side of the desktop 220. However, the present disclosure is not limited thereto and one or more than two desk lift mechanisms 100 may be included based on, for example, the size and/or shape of the desktop 220. The operation of the desk lift mechanisms 100 are the same; thus, they will be described herein and referred to together. However, the desk lift mechanisms 100 may be reversed from each other to correspond to the different sides of the desktop 220. For example, the desk lift mechanisms 100 may be either left-side or right-side, with the left-side and right-side desk lift mechanisms 100 being mirror images of each other. Thus, when installed in the variable height desk 200, the parallel arms 120 are arranged toward an inside (or center) of the desktop 220 with respect to the base mounting bracket 110.

The two (or more) desk lift mechanisms 100 in the variable height desk 200 may be connected to each other by the horizontal support member 300. As explained above, the horizontal support member 300 is connected between the support brackets 130 of the desk lift mechanisms 100. In some embodiments, the horizontal support member 300 may also be connected to the desktop 220. The horizontal support member 300 may ensure that the desk lift mechanisms 100 move (e.g., pivot) together without binding, which may occur if the desktop 220 is twisted by the user. The horizontal support member 300 also ensures that even when a user applies a force (e.g., a pulling or pushing force) to the desktop 220 at an area relatively far from the center of the desktop 220 between the desk lift mechanisms 100, the desktop 220 smoothly, stably, and evenly moves between different positions.

Although the illustrated embodiment shows one horizontal support member 300 extending between and connecting the rear parallel arms 120.2 of the desk lift mechanisms 100 to each other, the present disclosure is not limited thereto. In some embodiments, another horizontal support member 300 may be provided to extend between and connect the front parallel arms 120.1 of the desk lift mechanisms 100 to each other. For example, as the size of the desktop 220 and/or the spacing between the desk lift mechanisms 100 increases, the other horizontal support member 300 may be further prevent twisting of the desktop 220 and binding of the desk lift mechanisms 100.

In some embodiments, the bottom of the base 210 may have openings (e.g., cutouts) 211 therein under the desk lift mechanisms 100. The openings 211 allow for inspection and service of the desk lift mechanisms 100 without removal of the desktop 220 and/or without removing the desk lift mechanisms 100 from the variable height desk 200.

The base 210 may further include mounting rails onto which the base mounting brackets 110 of the desk lift mechanisms 100 are connected. The mounting rails may extend across the recess 230 from a front side of the base 210 to a rear side of the base 210, but the present disclosure is not limited thereto.

The desktop mounting brackets 140 of the desk lift mechanisms 100 are connected to the desktop 220. For example, the desktop mounting brackets 140 may be connected to an underside of the desktop 220 by mechanical fasteners, such as screws, nails, etc. However, the present disclosure is not limited thereto, and other methods of connecting the desktop mounting brackets 140 to the desktop 220 are possible, including adhesives, snap fitting devices, welding, etc.

The process of raising and lower the desktop 220 will now be described in more detail referring to FIGS. 3A-3D and 4A-4D.

Figure 3A:
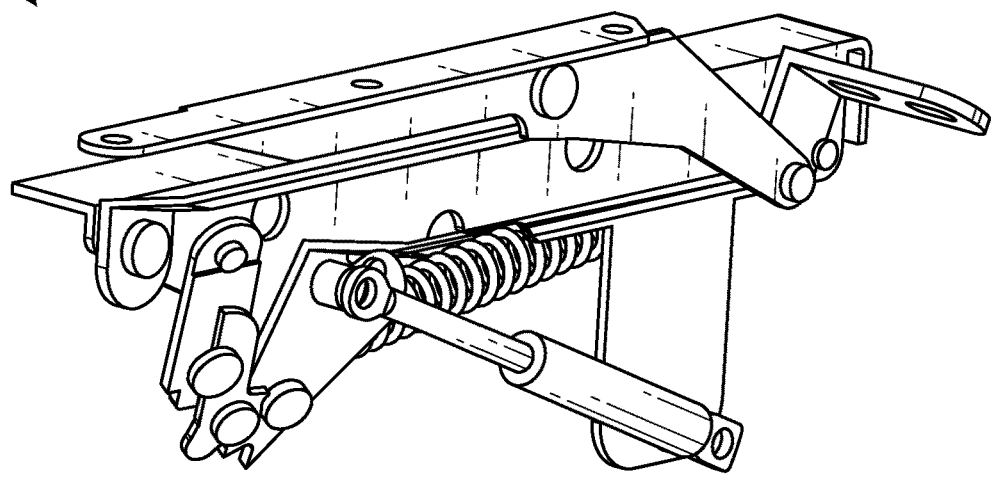
FIGS. 3A-3D are views of the desk lift mechanism shown in FIG. 1 in different orientations.
Figure 4A:
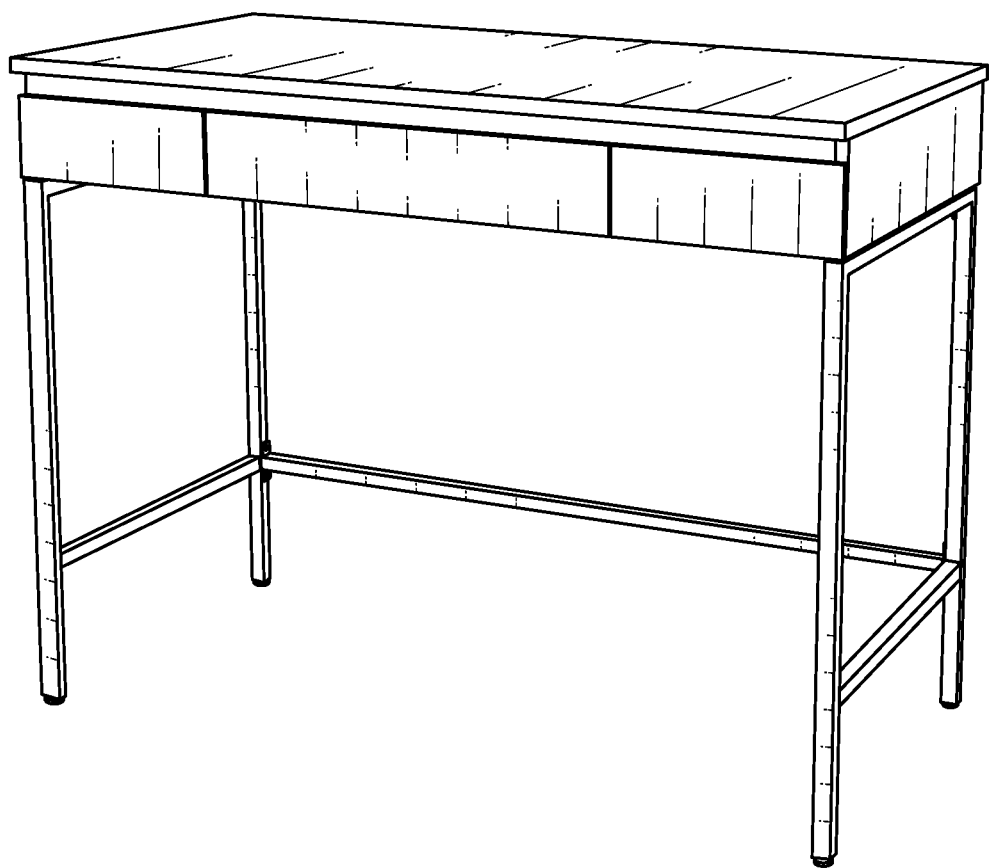
FIGS. 4A-4D show the variable height desk shown in FIG. 2 with a desktop thereof in different orientations.

FIGS. 3A and 4A show the desk lift mechanism 100 and the variable height desk 200 in the lowered state, respectively. The lowered state of the variable height desk 200 may also be referred to as a seated orientation, referring to how a user would sit at the variable height desk 200 to use it at this height (or configuration or orientation). In this orientation, the desktop 220 may rest on an upper edge of the base 210 to cover and/or close the recess 230. To raise the desktop 220, a user may grasp a lower surface or edge of the desktop 220. For example, the user's hands may grasp a front edge of the desktop 220 adjacent to the groove in the base 210. To raise the desktop 220, the user applies an upward force to the desktop 220. Due to the spring 170 of the desk lift mechanism 100, the weight of the desktop 220 is offset such that the user does not need to lift the entire weight of the desktop 220. In other words, the spring 170 compensates for some of the weight of the desktop 220. By lifting the desktop 220, the user may transition the variable height desk 200 from the lower orientation shown in, for example, FIG. 4A to an intermediate orientation (or intermediate height) shown in, for example, FIG. 4B or 4C. Due to the similarities in the different intermediate orientations shown in FIGS. 4B and 4C, they will not be separately described. Further, the variable height desk 200 is not limited to only two intermediate orientations (or heights) and may have more or fewer intermediate orientations. As the desktop 220 reaches the first intermediate orientation shown in FIG. 4B, the stop mechanism 150 may make an audible noise alerting the user that the desktop 220 is secured at the first intermediate height such that the user can release the desktop 220 and will be stay at the first intermediate height. If the user desires, the user can maintain the upward force on the desktop 220 and move it to the second (higher) intermediate orientation, at which time the stop mechanism 150 will produce another audible click. For example, the user can continuously raise the desktop 220 from the lowered position to any of the other positions directly.

The desktop 220 may be positioned more toward the user in the intermediate orientation that in the lowered position. In more detail, the desk lift mechanism 100 pivots forward (e.g., toward the user) slightly as it raises up. Thus, in the intermediate and more so in the raised orientation, the desktop 220 is nearer to the user. This configuration may provide an additional benefit to the user in that the user's knees are less likely to contact the base 210 when standing at the raised variable height desk 200.

Figure 3B:
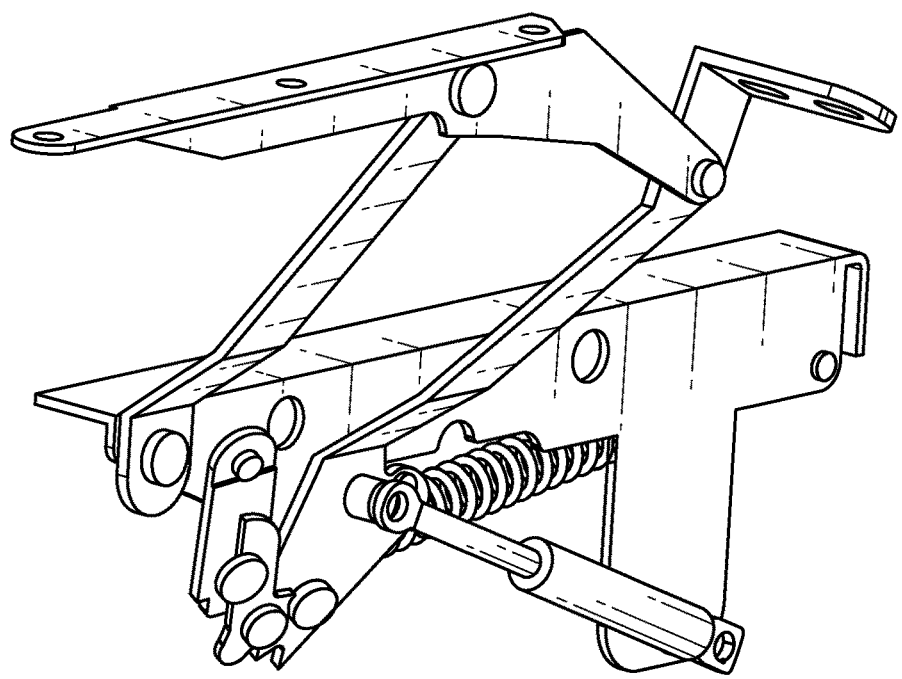
Figure 3C:
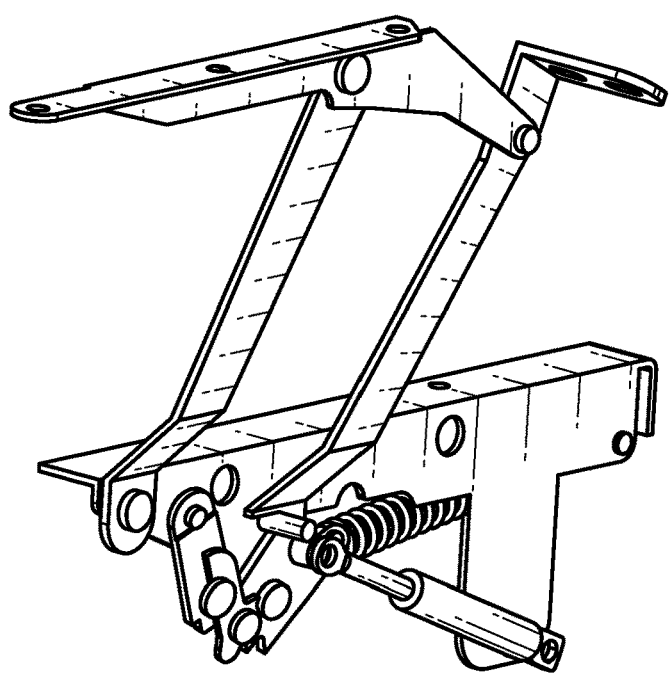

FIGS. 3B and 3C show the desk lift mechanism 100 in the two intermediate heights (or orientations). The term "intermediate orientation" or "intermediate height," as used herein, refers to an orientation (or height) other than (e.g., between) the lower orientation (see, e.g., FIGS. 3A and 4A) and the raised orientation (see, e.g., FIGS. 3D and 4D).

Figure 4B:
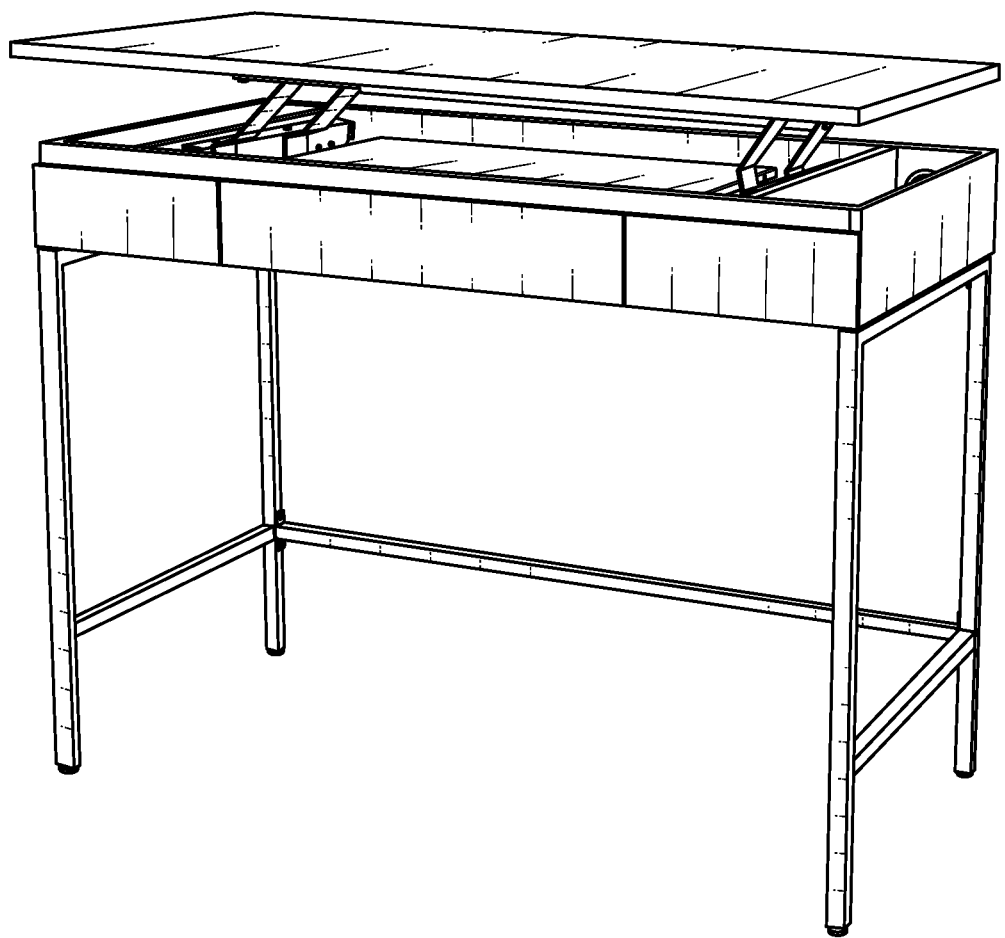
Figure 4C:
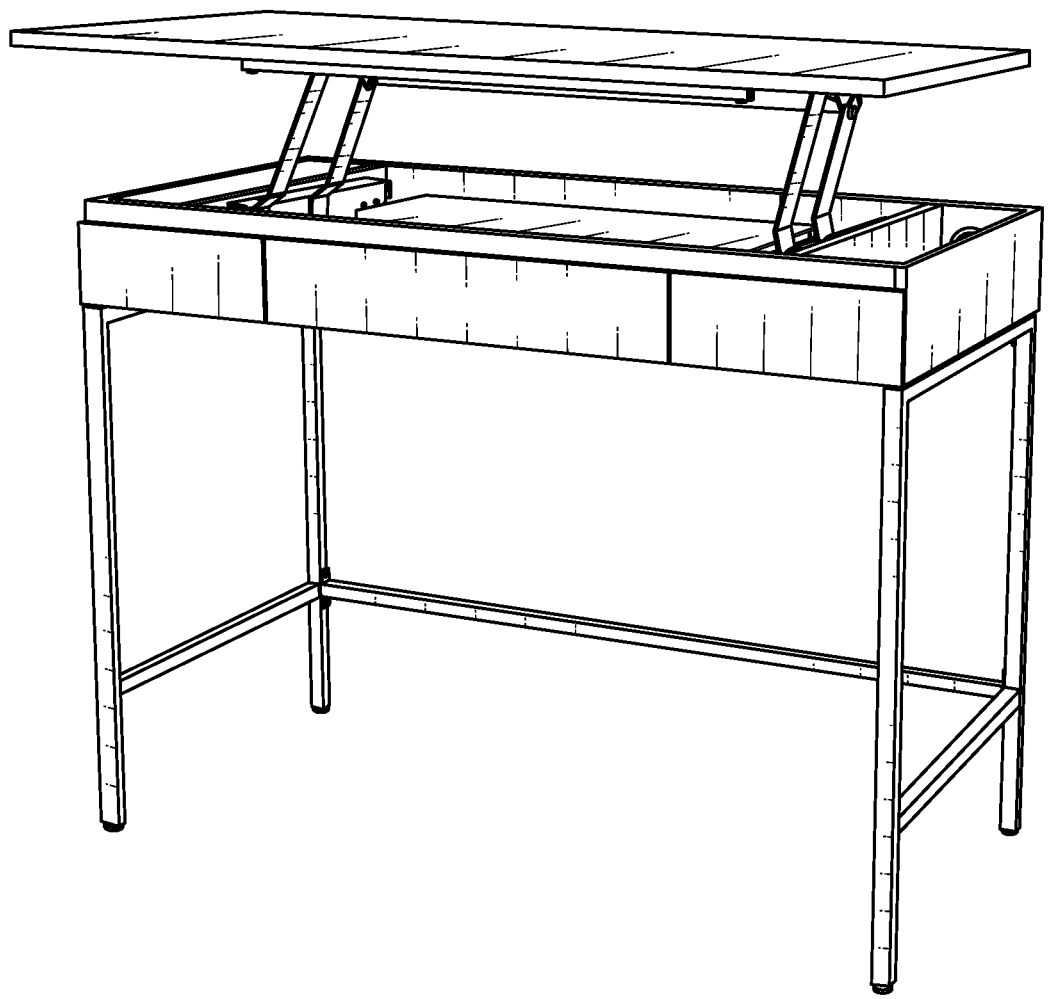

FIGS. 4B and 4C show the variable height desk 200 at two different intermediate heights, and FIGS. 3B and 3C show the desk lift mechanism 100 at the two different intermediate heights. The orientation of the desk lift mechanism 100 shown in FIG. 3B may correspond to the orientation of the variable height desk 200 shown in FIG. 4B, and the orientation of the desk lift mechanism 100 shown in FIG. 3C may correspond to the orientation of the variable height desk 200 shown in FIG. 4C.

As the user lifts the desktop 220 from the lowest height to one of the intermediate heights (referred to herein as the intermediate height for convenience), the user may receive a tactile response (e.g., may feel and/or hear a vibration or click) when the desk lift mechanism 100 settles into the next adjacent stop groove 151 of the stop mechanism 150. Upon receiving the tactile response, the user may release (e.g., let go of) the desktop 220 so that it settles into the desired height. Alternatively, if the user desires that the desktop 220 be at a higher height, the user may continue to lift the desktop 220 until another the user receives another tactile response, indicating that the desk lift mechanism 100 has settled into the next adjacent stop groove 151 of the stop mechanism 150.

Figure 3D:
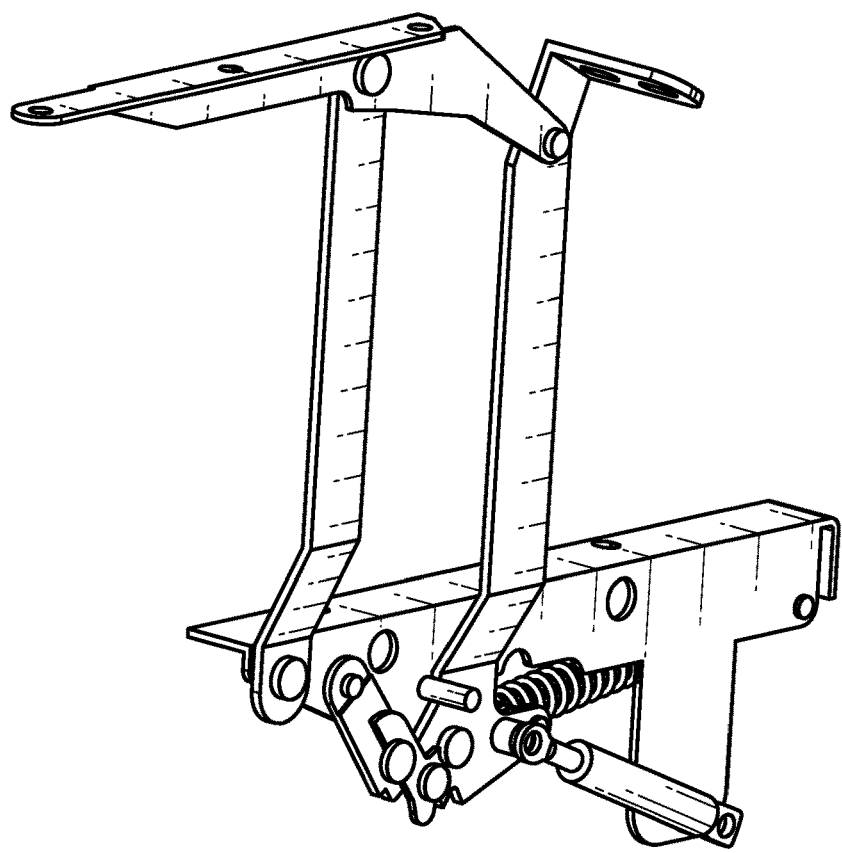
Figure 4D:
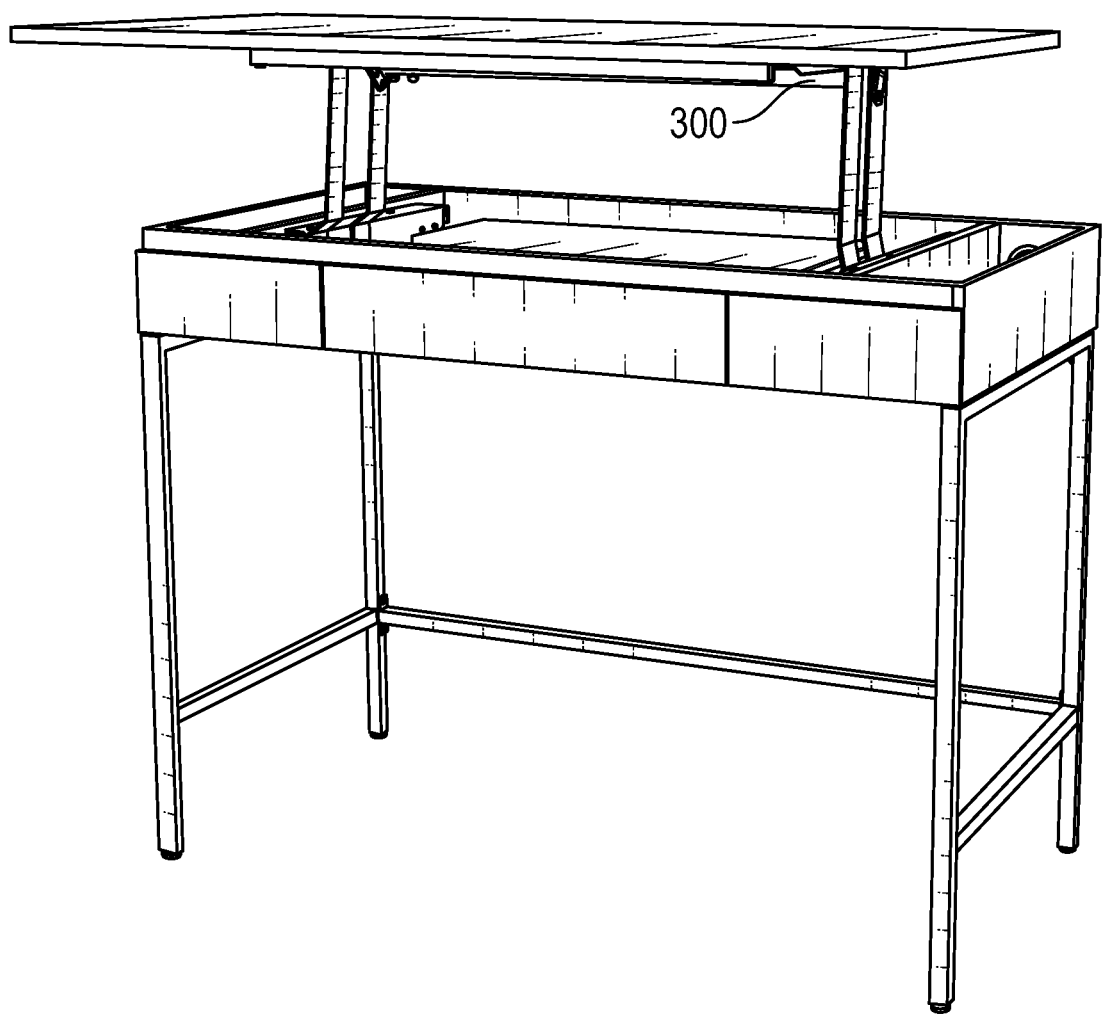

FIGS. 3D and 4D show the desk lift mechanism 100 and the variable height desk 200 in the raised (or upper) orientation, respectively. The manner of lifting the desktop 220 from the intermediate orientation to the raised orientation is the same or substantially the same as the manner of lifting the desktop 220 from the lower orientation to the intermediate orientation so the process will not be repeated herein. In the raised orientation, the rear parallel arm 120.2 may contact a stop 121 to prevent overextension (e.g., overrotation) of the parallel arms 120. The stop 121 may be, for example, a physical stop that protrudes from the base mounting bracket 110 and contacts a front (or forward, toward the user) side of the rear parallel arm 120.2 to stop the rotation of the parallel arms 120. However, this is just an example, and in other embodiments, the front parallel arm 120.1 may contact a stop to prevent overextension of the parallel arms 120. Because the parallel arms 120 are connected together via the desktop mounting bracket 140, only one of the parallel arms 120 needs to contact a stop 121 to prevent overextension of both parallel arms 120.

Hereinafter, the manner of lowering the desktop 220 will be described in more detail. When the user desires to lower the desktop 220, either from the raised orientation to either the intermediate or lower orientation or from the intermediate orientation to the lower orientation, the user may grasp the edge and/or upper surface of the desktop 220 and push the desktop 220 away from the user and/or downwardly. From the raised orientation, the initial motion of the desk lift mechanism 100 to lower the desktop 220 may be more away from the user than downwardly toward the base 210. However, at the intermediate height, the initial motion of the desk lift mechanism 100 to lower the desktop 220 may be more downwardly toward the base 210 than away from the user.

After the user applies sufficient force to the desktop 220 to overcome the restraint of the stop mechanism 150, the desktop 220 begins to move both away from the user and downwardly (e.g., downwardly toward the base 210). When the user desires to lower the desktop 220 to a height above the lower height, that is, to an intermediate height or to a lower intermediate height, the user retains control of the desktop 220 until it is retained in the adjacent (or desired) stop groove 151 of the stop mechanism 150.

However, when the user applies more force to the desktop 220, the desktop 220 may smoothly move past all of the intermediate stop grooves 151 without stopping. In conventional variable height desks, the desktop may be considered to be in an uncontrolled lowering state when a user applies force sufficient to overcome any restraint mechanisms. When the desktop of a conventional variable height desk is in an uncontrolled lowering state, it risks injuring the user and/or damaging components (e.g., computer monitors or other electronic devices) on the desktop. For example, in a conventional variable height desk, the desktop may move unrestrained (or substantially unrestrained) to the lower position and impact any stop mechanism (e.g., a hard stop or the like).

In the variable height desk 200 according to embodiments of the present disclosure, the desk lift mechanisms 100 include the struts 160 that restrain the desktop 220 before it reaches the lower height, giving users time to move their fingers away from the desktop 220 and preventing (or at least substantially mitigating) damage to components on the desktop 220. In more detail, when the user applies sufficient force to lower the desktop 220 and move past the next adjacent stop groove 151 of the stop mechanism 150, the desktop 220 will proceed under its own weight (e.g., without additional force being applied by the user) to the lowered position. Different from a conventional variable height desk where the desktop is considered to be in an uncontrolled lowering state, the desktop 220 is slowed by the struts 160 in the desk lift mechanisms 100. Thus, the desktop 220 is slowed in a controlled manner before it contacts the base 210, which allows users time to move their fingers clear of any interface between the desktop 220 and the base 210 and prevents damage or dislodgment to items on the desktop 220.

It will be understood that, although the terms "first", "second", "third", etc., may be used herein to describe various elements, components, regions, layers, levels, and/or sections, these elements, components, regions, layers, levels, and/or sections should not be limited by these terms. These terms are only used to distinguish one element, component, region, layer, level, or section from another element, component, region, layer, level, or section. Thus, a first element, component, region, layer, level, or section discussed below could be termed a second element, component, region, layer, level, or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the terms "exemplary" and "example" are intended to refer to an example or illustration. As used herein, the terms "use," "using," and "used" may be considered synonymous with the terms "utilize," "utilizing," and "utilized," respectively.

It will be understood that when an element or layer is referred to as being "on," "connected to," "coupled to," or "adjacent to" another element or layer, it may be directly on, connected to, coupled to, or adjacent to the other element or layer, or one or more intervening elements or layers may be present. In contrast, when an element or layer is referred to as being "directly on," "directly connected to," "directly coupled to," or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a desk lift mechanism and a variable height desk including the desk lift mechanism have been described and illustrated herein, many modifications and variations within those embodiments will be apparent to those skilled in the art. Accordingly, it is to be understood that a desk lift mechanism and a variable height desk including the desk lift mechanism according to the present disclosure may be embodied in forms other than as described herein without departing from the spirit and scope of the present disclosure. The present disclosure is defined by the following claims and equivalents thereof.

What is claimed is:

1. A desk lift mechanism comprising:
a base mounting bracket configured for mounting to a desk;
a plurality of parallel arms pivotably coupled to the base mounting bracket;
a desktop mounting bracket pivotably coupled to distal ends of the parallel arms;
a spring connected between a proximal end of one of the parallel arms and the base mounting bracket;
a strut connected between the proximal end of the one of the parallel arms and the base mounting bracket, the strut being configured to restrain movement of the parallel arms in a downward direction; and
a stop mechanism, the stop mechanism comprising:
a stop bar pivotably mounted to the base mounting bracket; and
a plurality of stop grooves in the stop bar,
wherein the one of the parallel arms has a protrusion thereon that is configured to fit into the stop grooves.

2. The desk lift mechanism of claim 1, wherein a pivotable coupling between the one of the parallel arms and the base mounting bracket is between the distal and proximal ends of the one of the parallel arms.

3. The desk lift mechanism of claim 2, wherein the one of the parallel arms is a second one of the parallel arms,
wherein a first one of the parallel arms is mounted at an end of the base mounting bracket, and the second one of the parallel arms is mounted at an area of the base mounting bracket spaced apart from the end thereof.

4. The desk lift mechanism of claim 3, wherein the parallel arms pivot about parallel axes.

5. The desk lift mechanism of claim 4, wherein the parallel axes are offset in a length direction of the base mounting bracket.

6. The desk lift mechanism of claim 5, wherein when the parallel arms are in an extended position, the desktop mounting bracket protrudes farther beyond a front end of the base mounting bracket than when the parallel arms are in a lowered position.

7. A variable height desk comprising:
a base;
a leg coupled to and supporting the base;
a desktop over the base; and
a plurality of desk lift mechanisms connected between the base and the desktop, each of the desk lift mechanisms comprising:
a base mounting bracket mounted to the base;
a plurality of parallel arms pivotable mounted to the base mounting bracket;
a desktop mounting bracket pivotably coupled to the parallel arms and fixedly mounted to the desktop;
a strut connected between the base mounting bracket and one of the parallel arms to restrain movement of the desktop in a direction toward the base; and
a stop mechanism, the stop mechanism comprising:
a stop bar pivotably mounted to the base mounting bracket; and
a plurality of stop grooves in the stop bar,
wherein the one of the parallel arms has a protrusion thereon that is configured to fit into the stop grooves.

8. The variable height desk of claim 7, further comprising a horizontal support member connecting the desk lift mechanisms to each other.

9. The variable height desk of claim 8, wherein the one of the parallel arms is a second one of the parallel arms, and
wherein a first one of the parallel arms is mounted to the base mounting bracket nearer to a front of the base than the second one of the parallel arms.

10. The variable height desk of claim 9, wherein the horizontal support member is connected to the second one of the parallel arms of the desk lift mechanisms.

11. The variable height desk of claim 10, wherein each of the desk lift mechanisms further comprises a spring, wherein the strut and the spring are both connected between the second one of the parallel arms and a rear end of the base mounting bracket.

12. The variable height desk of claim 11, wherein the second one of the parallel arms is pivotably coupled to the base mounting bracket at an area between where the desktop mounting bracket is coupled to the second one of the parallel arms and where the strut and the spring are connected to the second one of the parallel arms.

13. The variable height desk of claim 12, wherein the first one and the second one of the parallel arms pivot about parallel axes, and wherein the parallel axes are offset from each other in a direction from a front of the base to a rear of the base.

14. The variable height desk of claim 13, wherein the base comprises a bottom and a plurality of sides extending from a periphery of the bottom, and wherein an area between the bottom and the sides of the base forms a recess.

15. The variable height desk of claim 14, wherein the desk lift mechanisms are accommodated in the recess in the base.

16. The variable height desk of claim 15, wherein the base has openings in the bottom thereof at areas corresponding to the desk lift mechanisms.

17. The variable height desk of claim 16, wherein the base further comprises a plurality of mounting rails protruding from the bottom and in the recess, and wherein the base mounting brackets of the desk lift mechanisms are respectively coupled to the mounting rails.

18. The variable height desk of claim 17, wherein in a lowered state of the desktop, the desktop contacts an upper end of the sides of the base, and wherein the desktop protrudes past a front end of the base.

* * * * *